United States Patent [19]

Reynolds et al.

[11] Patent Number: 4,547,967
[45] Date of Patent: Oct. 22, 1985

[54] VEHICLE HYDRAULIC BRAKING SYSTEM

[75] Inventors: Desmond H. J. Reynolds, West Midlands, England; Anthony G. Price, Gwent, Wales; Roy Campbell, Worcestershire, England

[73] Assignee: Lucas Industries Public Limited Company, Birmingham, England

[21] Appl. No.: 612,574

[22] Filed: May 21, 1984

[30] Foreign Application Priority Data

May 21, 1983 [GB] United Kingdom ............... 8314113

[51] Int. Cl.$^4$ ..................... B60T 11/00; B60T 13/12
[52] U.S. Cl. ......................................... 303/7; 60/591; 180/6.2; 188/345
[58] Field of Search ............... 188/345; 303/7, 8, 52, 303/53; 180/6.2; 60/567, 581, 591

[56] References Cited

U.S. PATENT DOCUMENTS 2,366,310  1/1945  Boldt .................. 180/6.2 X
2,911,168 11/1959  Moreland ........... 180/6.2 X
3,477,549 11/1969  Barton ................ 188/345 X
4,265,491  5/1981  Shutt .................. 188/345 X

FOREIGN PATENT DOCUMENTS 2003782 11/1969  France ................... 303/52
2098687 11/1982  United Kingdom .

Primary Examiner—Bruce H. Stoner, Jr.
Assistant Examiner—Robert J. Oberleitner
Attorney, Agent, or Firm—Oldham, Oldham & Weber Co.

[57] ABSTRACT

A pair of tandem master cylinders have primary pressure spaces connected to the brakes on one pair of wheels on opposite sides of the vehicle, and an actuator for the brakes on a trailer is supplied with fluid under pressure from pipe-lines connected to each of the four pressure spaces and under the control of first and second disabler valves. Each disabler valve has a pair of inlet ports, each connected either to respective primary pressure spaces or respective secondary pressure spaces, and an outlet port connected to the actuator. When one master cylinder is operated on its own both disabler valves are closed to prevent the actuator from being operated. Failure of one pressure space, when both master cylinders are operated simultaneously, causes the corresponding disabler valve to close but the actuator can still be operated from the operative pressure spaces, through the other disabler valve.

7 Claims, 4 Drawing Figures

VEHICLE HYDRAULIC BRAKING SYSTEM

This invention relates to vehicle hydraulic braking systems of the kind in which separate master cylinders are operable simultaneously to apply brakes on both sides of a vehicle and brakes on a trailer for simultaneous vehicle and trailer retardation, and are operable independently to apply the brakes on one side of the vehicle to facilitate steering of the vehicle, means being provided for preventing application of the brakes on the trailer when one master cylinder is operated on its own.

Where used herein the term "master cylinder" is intended to cover constructions in which a pedal operates a piston to pressurise hydraulic fluid in a pressure space and to constructions in which a pedal is operative to operate a valve for controlling the supply of pressurised fluid to a pressure space, either from a source of high pressure fluid, or by throttling a supply of fluid which is normally circulated through the pressure space in a closed circuit at low pressure.

In our GB-A-2098687 we have described an hydraulic system of the kind set forth in which each master cylinder is of tandem construction having a primary pressure space in front of a pedal-operated primary piston and which is connected to the brakes on wheels on one side of the vehicle, a secondary pressure space in front of a secondary piston and which is connected to the brakes on the trailer through a common connection with the secondary pressure space of the other master cylinder, and normally-open recuperation valves connecting the respective pressure spaces to a reservoir for fluid, movement of the primary and secondary pistons in a brake-applying direction being operative to close the two recuperation valves whereafter to pressurise the fluid in the pressure spaces. When both master cylinders are operated simultaneously the pressure spaces of both master cylinders are pressurized but when one master cylinder is operated on its own fluid from the secondary pressure space of that master cylinder is returned to the reservoir through the secondary recuperation valve of the other master cylinder, which is open.

There is a possibility with the system of GB-A-2098687 that malfunction of one of the master cylinders during simultaneous operation can lead to situation in which the brakes on the trailer cannot be applied for example, by fluid from the secondary pressure spaces being returned to the reservoir.

According to our invention in an hydraulic braking system of the kind set forth each master cylinder is of tandem construction having a primary pressure space and a secondary pressure space, the primary pressure spaces are connected to the brakes of one pair of wheels on opposite sides of the vehicle, the secondary pressure spaces are connected to the brakes of the same or another pair of wheels on opposite sides of the vehicle, and actuator means for the brakes on the trailer is suppled with fluid under pressure from pipe-lines connected to each of the four pressure spaces and under the control of first and second disabler valves, the first disabler valve having a pair of inlet ports, each connected to one of the two primary pressure spaces, and a single outlet port connected to the actuator means, and the second disabler valve having a pair of inlet ports, each connected to one of the two secondary pressure spaces, and a single outlet port connected to the actuator means, the two disabler valves being so constructed and arranged that the actuator means can be supplied with fluid under pressure from a pressure space only when subjected to substantially equal pressures from the two pressure spaces to which the inlet ports of that disabler valve are connected.

This means that when one master cylinder is operated on its own both disabler valves will be closed to prevent the actuator means from being operated and, in consequence, to prevent the trailer brakes from being applied.

Failure of one of the pressure spaces of one of the master cylinders when both master cylinders are operated simultaneously causes the corresponding disabler valve to close. However the trailer brakes can still be applied from the corresponding pair of pressures spaces which are still operative, through the other disabler valve.

Of course, one pressure space failing when one master cylinder is operated on its own simply reduces the effective pressure available for assisting steerage of the vehicle but no pressure can be applied to the actuator means for the trailer brakes.

When the four pressure spaces of the master cylinders are supplied with fluid from a common reservoir, failure of a pressure space will, ultimately, lead to leakage of all the hydraulic fluid from the system with consequent total failure of the system. To safeguard against this occurring it is preferred for each pair of primary and secondary pressure spaces to be supplied with fluid either from separate reservoirs, or from separate compartments of a common reservoir. This ensures, despite failure of one pressure space with consequent loss of fluid from the circuit which includes that pressure space, that the vehicle and trailer brakes can still be operated from the two remaining pressure spaces, which are supplied with fluid from the one reservoir, or compartment, which is included in the circuit which is still operative.

Two embodiments of our invention are illustrated in the accompanying drawings in which.

Figure 1:
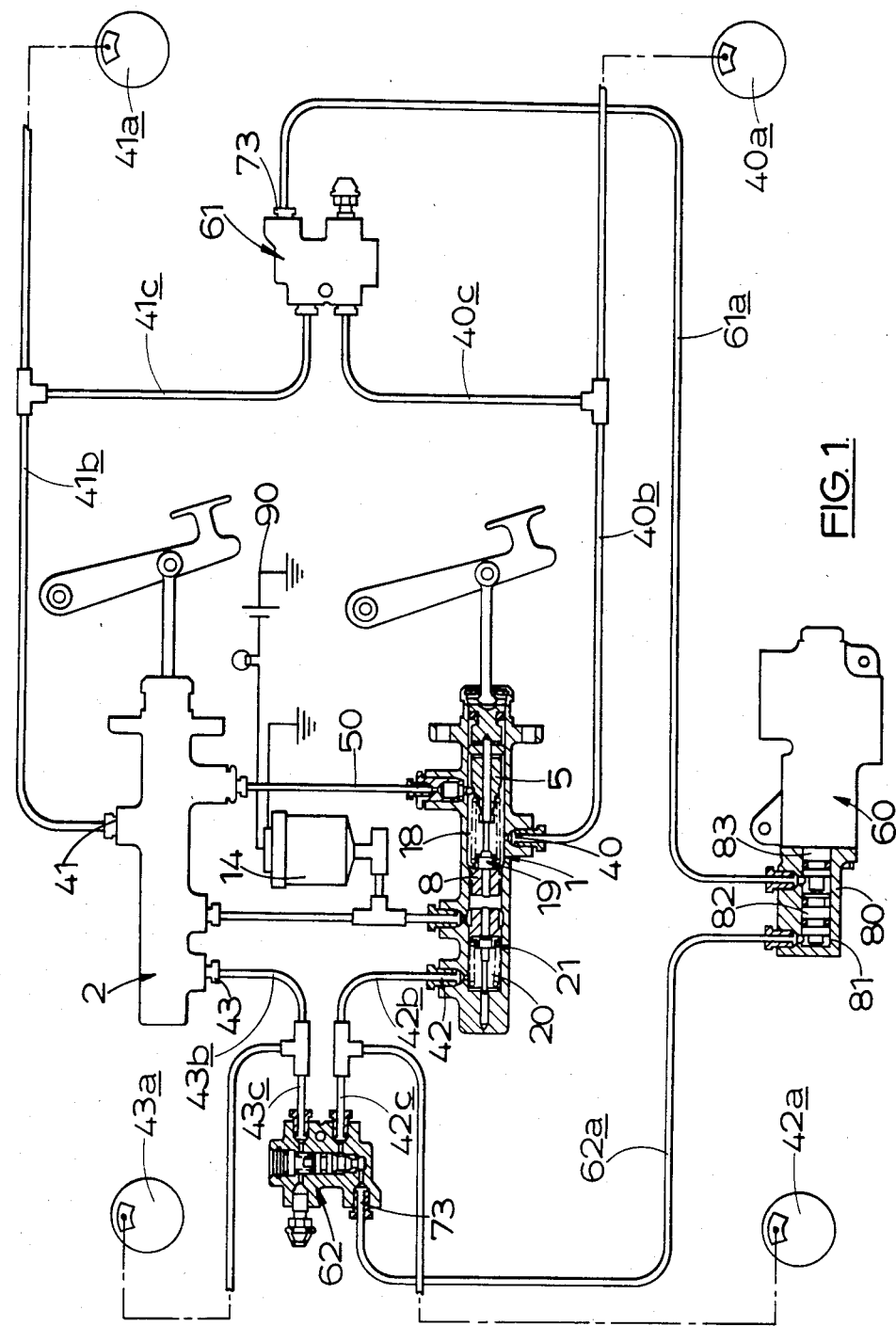
FIG. 1 is a layout of an hydraulic braking system for a vehicle/trailer combination.
Figure 2:
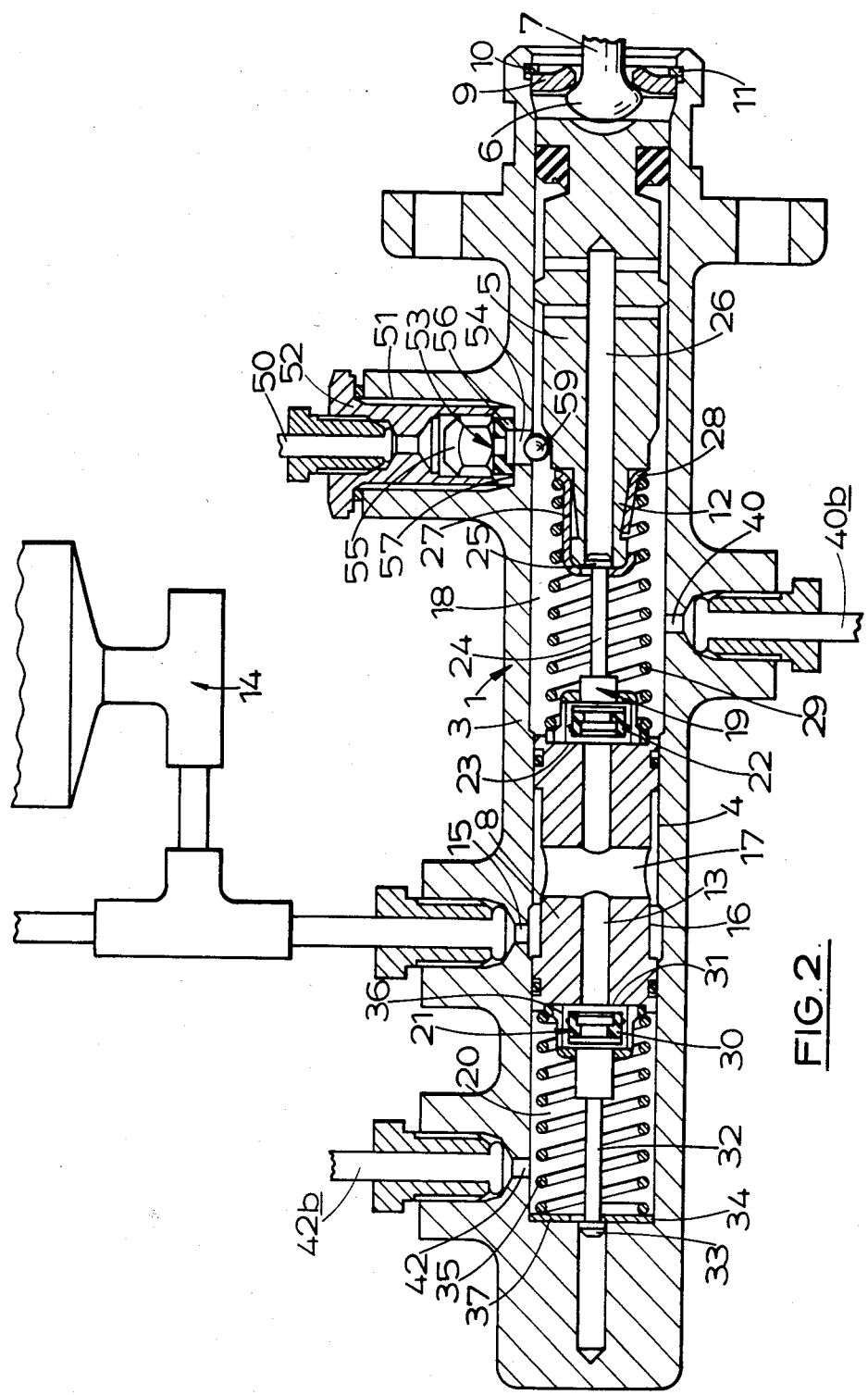
FIG. 2 is a longitudinal section through a master cylinder incorporated in the system of FIG. 1.
Figure 3:
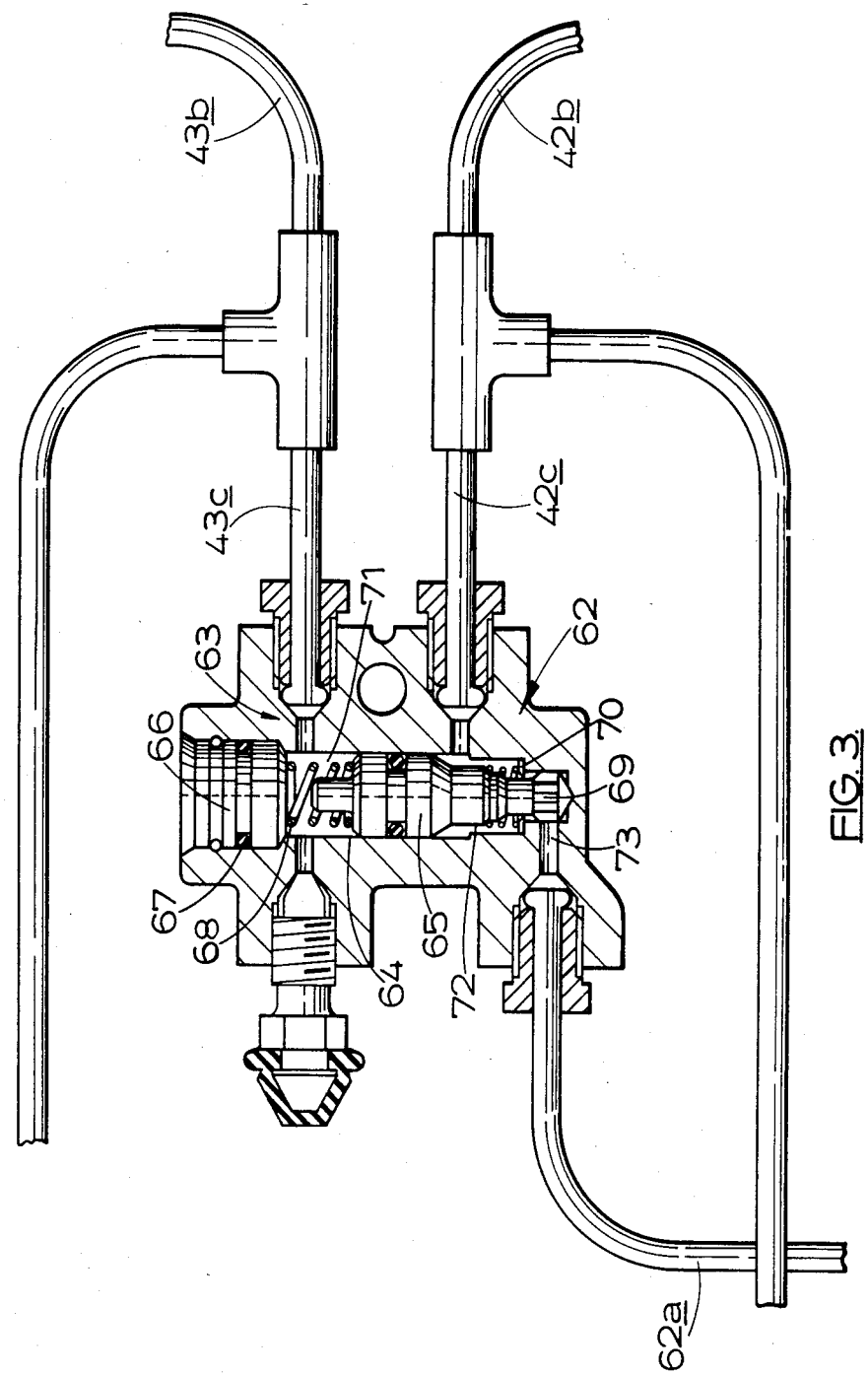
FIG. 3 is a longitudinal section through a disabler valve incorporated in the layout of FIG. 1.

The braking system shown in the layout of FIGS. 1 to 3 incorporates a dual master cylinder assembly which comprises two master cylinders 1 and 2. Since the master cylinders are identical in construction only the master cylinder 1 will be described in detail.

The master cylinder 1 comprises a body 3 provided with a longitudinal bore 4 in which works a primary piston 5 engaged at its rear end by a part-spherical head 6 on a pedal-operated push-rod 7, and a secondary or floating piston 8 disposed between the piston 5 and the closed end of the bore 4. A stop for the head 6 is formed by an annular collar 9 located by a spring ring or circlip 10 received in an annular groove 11 in the bore 4.

The primary piston 5 is provided with a forward extension 12 of reduced diameter.

The secondary piston 8 has a longitudinally extending through bore 13 which is in communication at all times with a reservoir 14 for hydraulic fluid through a recuperation port 15 in the wall of the body 3, an annular passage 16 in the wall of the piston 8, and a diametral passage 17 in the pistons 8 which traverses the bore 13.

A primary pressure space 18 defined in the bore 4 between the pistons 5 and 8 communicates with the reservoir 14 through a normally open primary recuperation valve 19, and a secondary pressure space 20 defined in the bore 4 between the secondary piston 8 and the closed end of the bore 4 communicates with the reservoir through a normally open secondary recuperation valve 21.

The recuperation valve 19 comprises a head 22 for engagement with a seating 23 surrounding the bore 13 at the adjacent end of the piston 8. The head 22 is carried by the forward end of an axially extending stem or rod 24 of which the opposite end carries an enlarged head 25 guided to slide in a longitudinally extending bore 26 in the adjacent end of the extension 12. The head 25 is retained within the bore 26 by a thimble 27 which fits over the extension 12. A flange 28 on the thimble 27 forms an abutment for one end of a compression return spring 29 of which the opposite end acts on a cage in which the head 22 is housed. In the position shown in the drawings the spring 29 urges the piston 5 into a retracted position with the head 22 spaced from the seating 23 by the engagement of the thimble 27 with the head 25.

The recuperation valve 21 comprises a head 30 for engagement with a seating 31 surrounding the opposite end of the bore 13 in the piston 8. The head 30 is carried by the rear end of a stem 32 of which the forward end has an enlarged head 33 working in a portion of the bore 4 which is of reduced diameter. The head 33 is disposed on the opposite side of a plate 34 which is in abutment with a shoulder 37 at the step in diameter. The plate 34 engages with the head 33 and forms an abutment for one end of a compression spring 35 of which the opposite end engages with a cage 36 in which the head 30 is housed. In the position shown the spring 35 acts through the plate 34 to urge it from engagement with a shoulder 37 at the step in diameter and to hold the head 30 in a retracted position spaced from the seating 31.

Outlet ports 40 and 41 leading from the primary pressure spaces 18 of the master cylinders 1 and 2 are connected to brakes 40a and 41a on the rear wheels on opposite sides of the vehicle through pipe-lines 40b and 41b. Outlets ports 42 and 43 leading from the secondary pressure spaces 20 are connected to brake 42a and 43a on the front wheels on opposite sides of the vehicle through pipe-lines 42b and 43b.

The two primary pressure spaces 18 of the master cylinders 1, 2 are interconnected by a transfer passage comprising a pipe-line 50 which is connected at each opposite end to a radial outlet passage 51 in the wall of the body 3 through a suitable union 52, a transfer valve 53, and a transfer port 54.

Each passage 51 extends upwardly from its respective bore 4 when the master cylinders are installed in a vehicle in their positions of use.

The transfer valve 53 comprises a valve member constituted by a piston 55, and a seal 56 of elastomeric material, suitably rubber, mounted on one end of the piston 55, the seal 56 being engageable with a seating 57 comprising a shoulder at a step in diameter in the passage 51 surrounding the port 54.

The pressure spaces 18 and 20 of both master cylinders 1 and 2 are also connected to an actuating valve 60 for operating brakes on wheels of a trailer through two disabler valves 61 and 62, of which the valve 61 is connected to the two primary spaces 18 and the valve 62 is connected to the two secondary pressure spaces 20.

The two disabler valves 61 and 62 are indentical in construction, and only the valve 62 will be described in detail.

The disabler valve 62 (FIG. 3) comprises a housing 63 having a stepped blind fluid bore 64 in which works a piston 65. The larger, open, end of the bore 64 is closed by an end plug 66 provided with a seal 67. The piston 65 is urged towards the smaller, closed, end of the bore 64 by means of spring 68 acting against the plug 66, and at that end carries a valve head 69 normally spaced at its inner face from a valve seating 70 disposed in the bore 64 at a shoulder of the step in diameter and through which the head is carried. The outlet port 43 is connected through a branch line 43c to a space 71 defined in the bore 64 between the piston 65 and the plug 66, and the outlet port 42 is connected to a space 72 defined in the bore 64 between the piston 65 and the seating 70. An outlet port 73 on the side of the bore remote from the seating 70 leads to the trailer actuating valve 60.

The actuating valve 60 comprises a housing 80 having a bore 81 in which works a floating piston 82 which, in turn, engages at its inner end with a piston 83 for actuating means for applying the trailer brakes. The outlet ports 73 from the two disabler valves 61 and 62 are connected through pipe-lines 61a and 62a to respective chambers in the bore 81 at opposite ends of the floating piston 82 so that opposite ends of the piston 82 are exposed to outlet pressures from different disabler valves.

The layout incorporates a fluid-level electrically-operated warning circuit 90.

When both master cylinders are operated simultaneously a short forward movement of the pistons 5 and 8 with corresponding compression of the springs 29 and 35 is sufficient to cause the heads 22 and 30 to engage with the seatings 23 and 31 to isolate the reservoir 14 from both pressure spaces 18 and 20. Simultaneously, or almost immediately thereafter, the pistons 5 also urge the thrust members 59 radially outwardly. These movements urge the valve members 55 away from the adjacent seatings 57 and into fully open positions. Further movement of the pistons 5 in the same directions cause fluid to flow through the outlet ports 40, 41 to the brakes 40a, 41a on the rear wheels, through the outlet ports 42 and 43 to the beams 42a, 43a on the front wheels, and to the transfer passage 50 through the open transfer valves 53 so that the two pressure spaces 18 are in free communication to compensate for differential wear of the linings of the rear wheel brakes. The fluid from the four outlet ports 40, 41 and 42, 43 act on opposite ends of the pistons 65 of the two disabler valves 61 and 62 respectively so that both pistons 65 are pressure balanced and are held in neutral positions with the heads 69 spaced from the seatings 70. This permits fluid from the outlet ports 41 and 42 to flow through the respective disabler valves 61 and 62 to the trailer valve 60 whereby to operate the trailer brakes.

When one master cylinder is operated on its own, say the master cylinder 1, as before forward movement of the piston 5 and 8 with corresponding compression of the spring 29 is sufficient to cause the heads 22 and 30 to engage with the seatings 23 and 31 to isolate the reservoir 14 from both pressure spaces 18 and 20. Simultaneously, or almost immediately thereafter, the piston 5 also urges the thrust member 59 radially outwards, urging the valve member 57 into a fully open position. Further movement of the pistons 5 and 8 in the same direction causes fluid to flow through the outlet ports 40 and 42 to the corresponding brakes on that one side of the vehicle, to the two disabler valves 61 and 62, and to the transfer passage 50 through the open transfer valve 53 which, in turn, creates a pressure drop across the valve member of the other master cylinder 2, urging that valve member towards the adjacent seating in the body of the master cylinder to cut-off communication between the two primary pressure spaces 18.

The pressure supplied to the two disabler valves 61 and 62 is operative to urge each disabler valve into a position to isolate the pressure spaces 18 and 20 from the trailer valves 60 or to prevent communication between the pressure spaces and the trailer valve. Specifically the pressure from the pressure space 20 acts on the piston 65 of the disabler valve 62 to urge the head 69 into engagement with the seating 70 to isolate the pressure space 20 from the bore 81, and the pressure from the pressure space 18 acts on the respective opposite end of the piston of the disabler valve 61. The presence of the piston prevents communication between pressure space 18 and the trailer valve.

It follows therefore that when one master cylinder is operated on its own, only the brakes on the wheels on one side of the vehicle are operated, and the trailer valve 60 is inoperative so that the trailer brakes cannot be applied.

Should one of the pressure spaces fail when both master cylinders 1 and 2 are being operated simultaneously, the brake applied directly from that failed space cannot be applied. Similarly the corresponding disabler valve 61 and 62 adopts a mode similar to that assumed when one of the master cylinders is operated on its own, and as described above. That is to say the disabler valve in question acts to isolate the trailer valve 60 from a supply of pressure fluid. Since the other disabler valve is still operative, the said other disabler valve ensures a supply of fluid under pressure to the trailer valve 60 for operation of the brakes on the trailer, with that supply acting on the piston 82 through the respective connection.

Since a common reservoir 14 supplies both master cylinders 1 and 2, failure at one pressure space will, ultimately, lead to leakage of all the hydraulic fluid from the system with consequent total failure of the system. To safeguard against this occurring each pair of primary and secondary pressure spaces are preferably supplied with fluid, either from separate reservoirs, or from separate compartments of a common reservoir.

Figure 4:
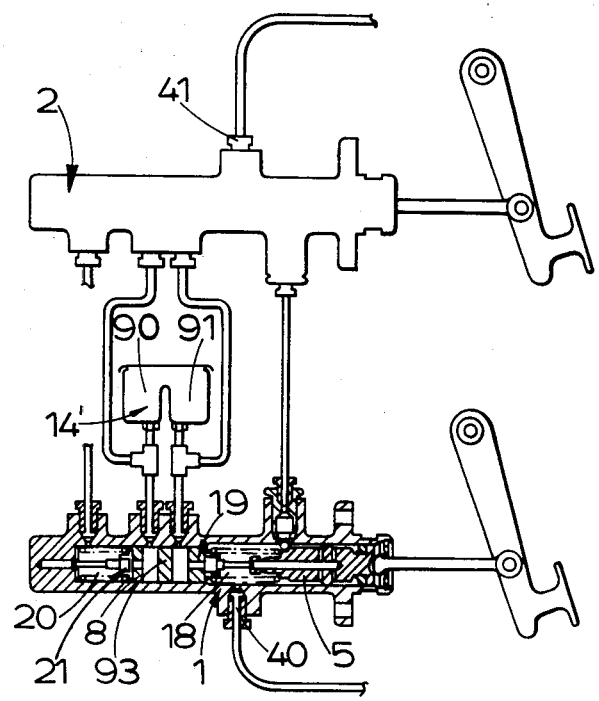
FIG. 4 is a layout similar to FIG. 1 but showing a modification.

As shown in the layout of FIG. 4, the two master cylinders 1 and 2 are supplied from separate chambers 90 and 91 of the reservoir 14'. To achieve this the chamber 90 supplies the two secondary pressure spaces 20 through the respective recuperation valves 21, and the chamber 91 supplies the two primary pressure spaces 18 through the respective valves 19, respective connections between the chambers 90 and 91 and the recuperation valves 21 and 19 being isolated from each other by a central partition portion 93 of the piston 8.

With this arrangement failure of one pressure space only leads ultimately to failure of the corresponding pressure space of the other master cylinder, but the two remaining pressure spaces remain operative to permit the brakes on both sides of the vehicle, and on the trailer, still to be applied as described above.

The construction and operation of the system shown in the layout of FIG. 4 is otherwise the same as that of FIG. 1 and corresponding reference numerals have been applied to corresponding parts.

We claim:

1. An hydraulic braking system for a vehicle-trailer combination wherein brakes are provided on wheels on opposite sides of said vehicle, and brakes are provided on wheels of said trailer, said system comprising first and second hydraulic master cylinders which are operable simultaneously to apply said brakes on both sides of said vehicle and brakes on said trailer for simultaneous vehicle and trailer retardation, and which are operable independently to apply said brakes on one side of said vehicle to facilitate steering, and means for preventing application of said brakes on said trailer when one of said master cylinders is operated on its own, wherein each said master cylinder is of tandem construction having a primary pressure space and a secondary pressure space, said primary pressure spaces are connected to said brakes of one pair of wheels on opposite sides of said vehicle, the secondary pressure spaces are connected to said brakes of another pair of wheels on opposite sides of said vehicle, and actuator means for the brakes on said trailer is supplied with fluid under pressure from pipe-lines connected to each of said four pressure spaces, first and second disabler valves being provided to control said supply of fluid from said pressure spaces to said actuator means, said first disabler valve having a pair of inlet ports, each connected to one of said two primary pressure spaces, and a single outlet port connected to said actuator means, and said second disabler valve having a pair of inlet ports, each connected to one of said two secondary pressure spaces, and a single outlet port connected to said actuator means, said two disabler valves being so constructed and arranged that said actuator means can be supplied with fluid under pressure from one of said pressure spaces only when subjected to substantially equal pressures from said two pressure spaces to which said inlet ports of that disabler valve are connected.

2. An hydraulic braking system as claimed in claim 1, wherein one of said primary pressure spaces is permanently isolated from said actuator means by a respective one of said two disabler valves, and said secondary pressure space of the other of said master cylinders is permanently isolated from said actuator means by the other of said disabler valves.

3. An hydraulic braking system as claimed in claim 1, wherein each said disabler valve comprises a housing incorporating a valve means for controlling communication between one of said inlet ports and said outlet port, and pressure-responsive means for holding said valve in an open position when pressure is present at both said inlet ports.

4. An hydraulic braking system as claimed in claim 3, wherein said housing has a bore and said pressure-responsive means comprises a piston working in said bore and having opposed areas adapted to be subjected to pressures at said inlet ports, and said valve means comprises a head carried by said piston and adapted to co-operate with a seating to control communication between the said one inlet port and said outlet port, said piston being held in a neutral position in which said valve head is spaced from said seating when said opposed areas are subjected to the pressure at the inlet ports, and said valve head is movable in a first direction and into first position in which said head engages with said seating to isolate the said one inlet port from said outlet port when pressure is present only at the said one inlet port, pressure present at the other said inlet port being prevented from being supplied to said outlet port by the presence of said piston in the bore.

5. An hydraulic braking system as claimed in claim 4, wherein the bore is of stepped outline, opposite ends of said piston are subjected to pressure at said two inlet ports, and said head is carried through said seating from the end of the piston which is subjected to pressure from the said one inlet port.

6. An hydraulic braking system as claimed in claim 1, wherein said actuating means comprises a housing having a bore, and a piston subjected to pressure at said outlet ports of both said disabler valves whereby said actuating means is operable when pressure is present at at least one of said outlet ports.

7. An hydraulic working system as claimed in claim 1, wherein each of the primary pressure spaces are provided with fluid from a first common reservoir through normally-open primary recuperation valves, and each of the secondary pressure spaces are provided with fluid from a second common reservoir separate from the first through normally-open secondary recuperation valves.

* * * * *